United States Patent
Watanabe et al.

(10) Patent No.: US 6,718,149 B2
(45) Date of Patent: Apr. 6, 2004

(54) LIQUID CRYSTAL DISPLAY PANEL HAVING FRAME AREA FORMED WITH VERNIER IN NON-TRANSPARENT CONDUCTIVE CONNECTOR

(75) Inventors: Makoto Watanabe, Tokyo (JP); Syunsuke Shiga, Tokyo (JP)

(73) Assignee: NEC LCD Technologies, Ltd (JP)

(*) Notice: Subject to any disclaimer, the term of this patent is extended or adjusted under 35 U.S.C. 154(b) by 15 days.

(21) Appl. No.: 10/091,030

(22) Filed: Mar. 6, 2002

(65) Prior Publication Data
US 2002/0130984 A1 Sep. 19, 2002

(30) Foreign Application Priority Data
Mar. 14, 2001 (JP) .......................... 2001-072537

(51) Int. Cl.[7] .................. G02F 1/1339; G02F 1/333
(52) U.S. Cl. ........................ 399/153; 399/158
(58) Field of Search ................. 349/158, 155, 349/149, 100, 152, 925

(56) References Cited
U.S. PATENT DOCUMENTS 5,684,555 A * 11/1997 Shiba et al. ............ 349/149
5,982,470 A * 11/1999 Nakahara et al. ....... 349/153
6,181,405 B1 * 1/2001 Izumi .................. 349/153
6,198,519 B1 * 3/2001 Chang ................. 349/129

* cited by examiner

Primary Examiner—Toan Ton
(74) Attorney, Agent, or Firm—Dickstein, Shapiro, Morin & Oshinsky, LLP.

(57) ABSTRACT

An active matrix liquid crystal display panel has a pair of substrate structure and liquid crystal confined in a space between the substrate structures; non-transparent signal terminals and non-transparent connectors are formed in the frame area of one of the substrate structure where the thin film transistors and pixel electrodes are formed together with scanning and data signal lines; when a seal layer is formed along a predetermined route in the frame area, the manufacturer checks a negative vernier formed in the connectors to see whether or not the seal layer extends along the predetermined route before the assemblage so as to enhance the reliability of products without sacrifice of the pixel matrix.

20 Claims, 7 Drawing Sheets

LIQUID CRYSTAL DISPLAY PANEL HAVING FRAME AREA FORMED WITH VERNIER IN NON-TRANSPARENT CONDUCTIVE CONNECTOR

FIELD OF THE INVENTION

This invention relates to a liquid crystal display panel and, more particularly, to a liquid crystal display panel having a wiring pattern formed in the peripheral area thereof.

DESCRIPTION OF THE RELATED ART

A typical example of the liquid crystal display has a pair of transparent substrate structures. A sealing layer keeps the transparent substrate structures spaced from each other, and liquid crystal fills the space between the transparent substrate structures. Conductive electrodes and thin film transistors are formed on the inner surface of at least one of the transparent substrate structures, and formed a matrix of pixels together with the liquid crystal. Both inner surfaces are covered with orientation films. Each of the orientation films was rubbed in a predetermined direction. The rubbing lines in the orientation films cause the liquid crystal molecules property oriented. Signal terminals and signal lines are further formed on the transparent substrate structure together with the conductive electrodes, and signals are selectively supplied through the terminals and signal lines to the electrodes. When the signals reaches selected electrodes, local electric fields are created in the liquid crystal, and makes the associated pixels transparent. Then, the light passes the transparent pixels, and forms a picture.

Figure 1:
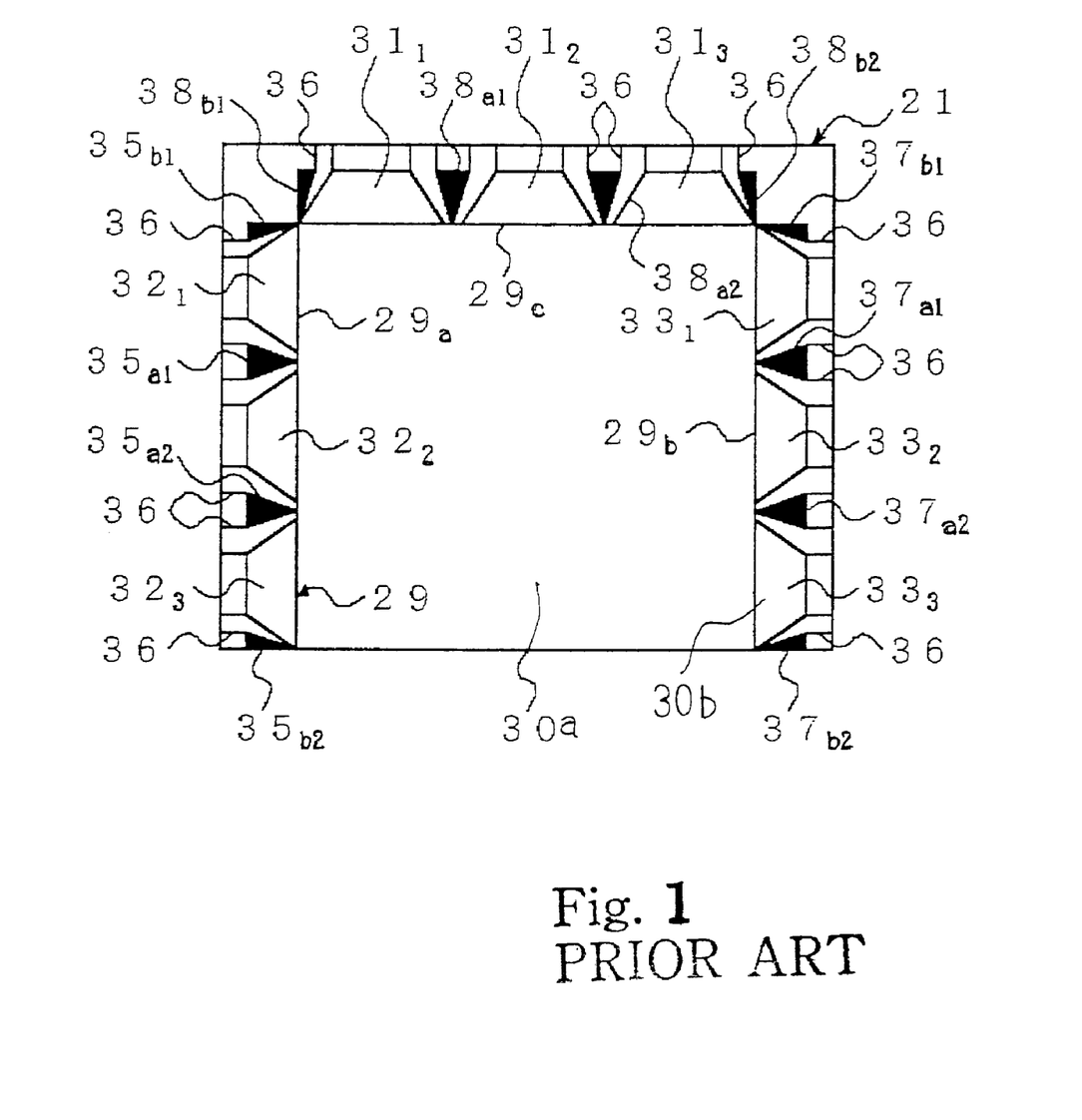
FIG. 1 is a plane view showing the arrangement of the terminals and interconnections on the inner surface of the substrate structure forming a part of the liquid crystal display panel.
Figure 2:
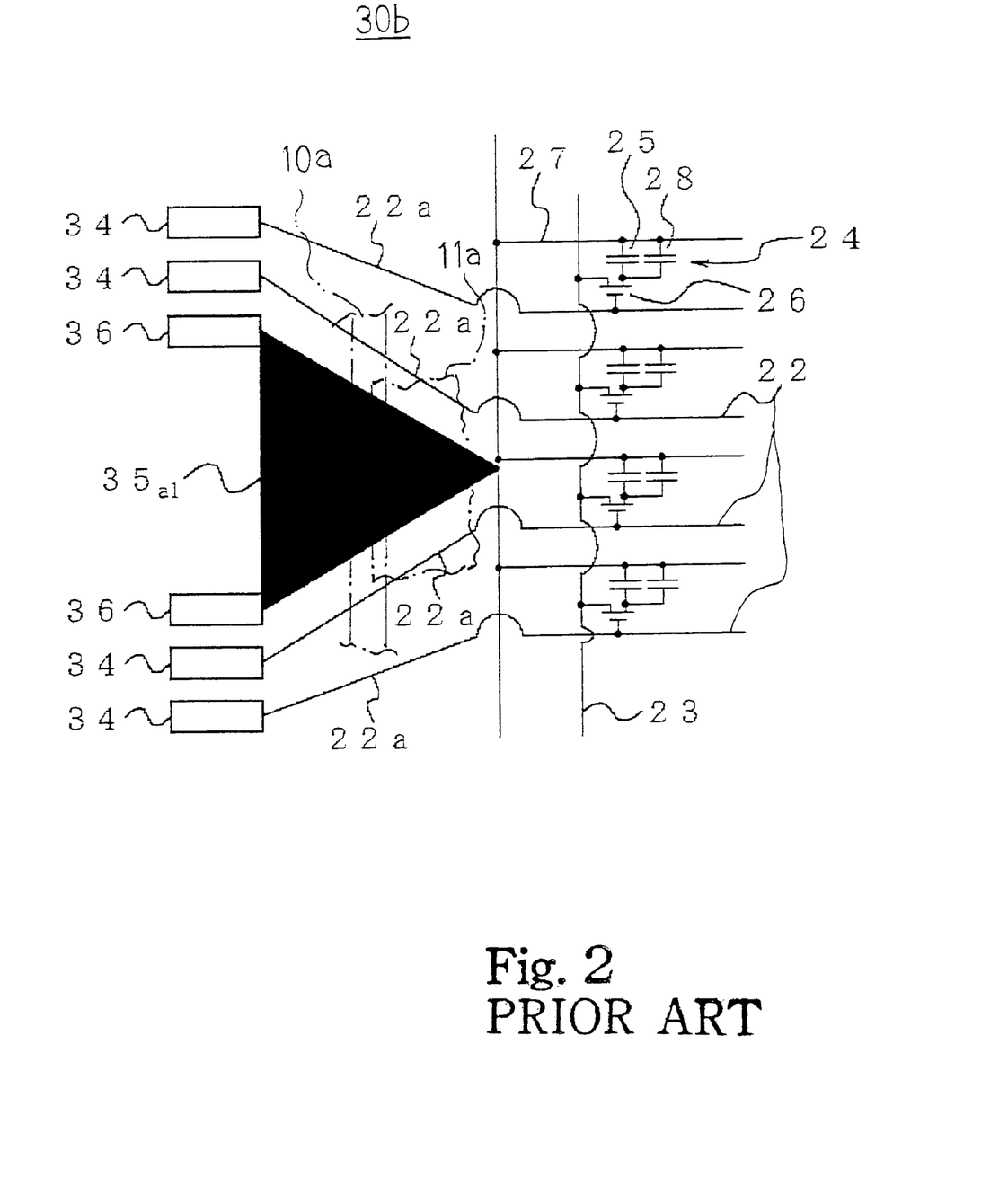
FIG. 2 is a schematic view showing the connection between the terminal/interconnection/connectors and the signal lines on the inner surface of the substrate structure.

FIG. 1 shows the inner surface of the aforementioned substrate structure. Reference numeral 21 designates a glass substrate, and the inner surface is divided into an image-forming area 30a and a frame area 30b. FIG. 2 shows a part of the frame area 30b.

The image-forming area 30a is assigned to the matrix of pixels and the signal lines, and the frame-area 30b is assigned to a common line 29, terminal blocks $31_1$ to $31_3$, $32_1$ to $32_3$, $33_1$ to $33_3$ and common terminals 36 and connectors $35_{a1}$, $35_{a2}$, $35_{b1}$, $35_{b2}$, $37_{a1}$, $37_{a2}$, $37_{b1}$, $37_{b2}$, $38_{a1}$, $38_{a2}$, $38_{b1}$ and $38_{b2}$. The common line 29 extends along a pair of the side lines of the glass substrate 21 and one of the end lines, and the three portions of the common line 29 are labeled with 29a, 29b and 29c, respectively.

One of the connectors $35_{a1}$ and the associated terminal block are enlarged in FIG. 2. The connector $35_{a1}$ is formed of non-transparent conductive material, and occupies a triangle area. The connectors $35_{a1}$, $35_{a2}$, $35_{b1}$, $35_{b2}$, $37_{a1}$, $37_{a2}$, $37_{b1}$, $37_{b2}$, $38_{a1}$, $38_{a2}$, $38_{b1}$, and $38_{b2}$ occupy a wide area so that the resistance is reduced. The non-transparent triangle connectors $35_{a1}$, $35_{a2}$, $35_{b1}$, $35_{b2}$, $37_{a1}$, $37_{a2}$, $37_{b1}$, $37_{b2}$, $38_{a1}$, $38_{a2}$, $38_{b1}$ and $38_{b2}$ further serve as a photo-shield. The connector $35_{a1}$ is connected at the outer end thereof to the common terminals 36 and at the inner end thereof to the common line 29a. Signal terminals 34 are formed on both sides of the common terminals 36, and are assigned to a scanning signal. The signal terminals 34 are connected to the scanning lines 22 through interconnections 22a, and the scanning lines 22 extend in parallel to one another across the central area 30a. Data lines 23 extend in parallel to one another across the central area 30a in a direction perpendicular to the scanning lines 22. Only one data line 23 is shown in FIG. 2.

The pixels are arranged in rows and columns, and each pixel is designated by reference numeral 24. The pixel 24 is equivalent to a series combination of the thin film transistor 26 and a parallel combination of capacitors 25/28. The capacitor 25 represents a piece of liquid crystal between a pixel electrode and a common electrode, and the other capacitor 28 is called as "common storage". The scanning lines 22 are connected to the gate electrodes of the thin film transistors 26 in the rows of pixels 24, respectively, and the data lines 23 are connected to the drain nodes of the thin film transistors 26 in the columns of pixels 24, respectively.

When a picture is to be produced in the matrix of pixels 24, the scanning lines 22 are sequentially changed to an active level, and an image-carrying signal is synchronously supplied through the data lines 23 to the rows of pixels 24. The pixels 24 selectively become transparent, and back light passes through the transparent pixels 24 so that the picture is produced on the matrix of pixels 24.

As described hereinbefore, the sealing layer 10a extends in the frame area 30b, and the matrix of pixels 24 is converted with the orientation layers 11a. The sealing layer 10a passes on the non-transparent triangle connectors $35_{a1}$, $35_{a2}$, $35_{b1}$, $35_{b2}$, $37_{a1}$, $37_{a2}$, $37_{b1}$, $37_{b2}$, $38_{a1}$, $38_{a2}$, $38_{b1}$ and $38_{b2}$, and the periphery of the orientation layer 11a reaches the non-transparent triangle connectors $35_{a1}$, $35_{a2}$, $35_{b1}$, $35_{b2}$, $37_{a1}$, $37_{a2}$, $37_{b1}$, $37_{b2}$, $38_{a1}$, $38_{a2}$, $38_{b1}$ and $38_{b2}$.

The sealing layer 10a is to have a predetermined width and pass a predetermined route in the peripheral area 30b. If the sealing layer 10a is too narrow or deviated from the predetermined route, the liquid crystal is liable to be leaked. On the other hand, the orientation layer 11a is to be well aligned with the matrix of pixels 24. If the orientation layer is offset from the matrix of pixels 24, the liquid crystal is not properly oriented, and a picture produced thereon is degraded.

In the circumstances, it is proposed to form a vernier in the frame area. A vernier is disclosed in Japanese Patent Application laid-open No. 8-106100, and the manufacturer checks the vernier to see whether or not the sealing layer is properly routed in the frame area. Another vernier is disclosed in Japanese Patent Application laid-open No. 11-024079, and the manufacturer checks the vernier to see whether or not the orientation layer is well aligned with the matrix of pixels. Thus, the vernier is preferable from the view point of high reliability of the products.

However, the prior art verniers require additional areas in the frame areas, and the frame areas are widened. The narrower the frame area, the wider the image-forming area. For this reason, the vernier is not preferable from the view point of the wide image-forming area.

SUMMARY OF THE INVENTION

It is therefore an important object of the present invention to provide a liquid crystal display panel, which is highly reliable without sacrifice of the image-forming area.

Figure 3:
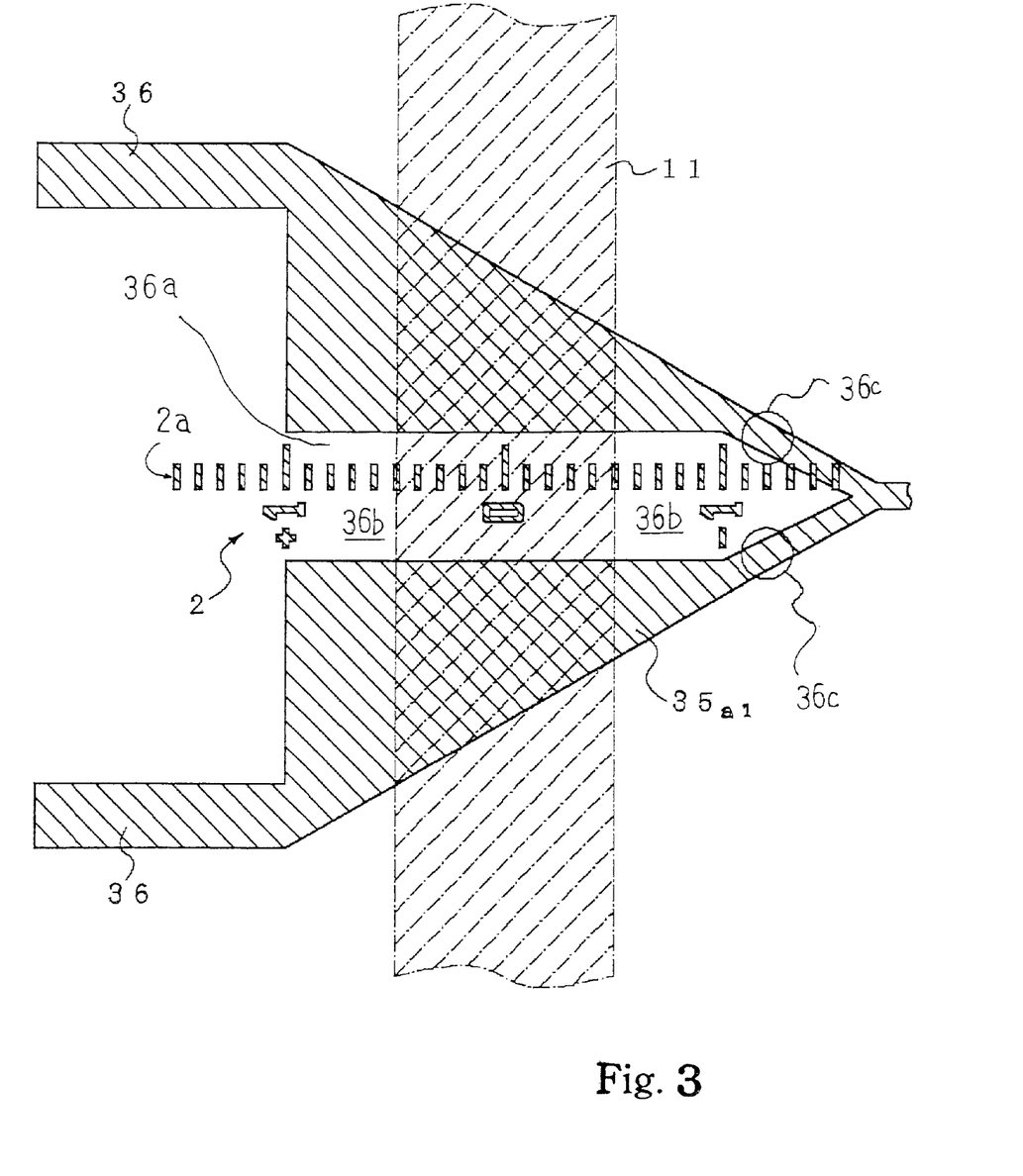
FIG. 3 is a plane view showing the positive vernier formed in the connector.

The present inventors contemplated the problem inherent in the prior art liquid crystal display panels, and noticed that the vernier was to be formed in the connectors. First, the inventors removed the non-transparent substance from a generally rectangular area 36a in the connector $35_{a1}$, and formed a positive vernier 2 in the rectangular area 36a as shown in FIG. 3. The graduations 2a and numerals "+1"/"0"/"−1" were non-transparent so that there remains wide transparent area 36b in the generally rectangular area 36a inside the connector $35_{a1}$. The graduations 2a are convenient to the manufacturer in order to specify the route occupied by a seal layer 11. In this instance, the seal layer 11 had the width from +0.5 to −0.5, and the manufacturer would make the decision that the seal layer 11 was properly formed. The positive vernier 2 was formed inside the connector $35_{a1}$, and any additional area was not required for the positive vernier 2.

However, the positive vernier 2 was causative of large resistance due to the narrow portions 36c in the connector $35_{a1}$. Moreover, the back light passed through the wide transparent area 36b, and undesirably penetrated into the image-forming area. The large resistance was causative of cross-taking and irregular brightness. The leaked light caused the picture to be in irregular brightness. In this situation, the inventors concluded that, although verniers formed inside the connectors reduced the frame area, negative verniers were desirable from the viewpoint of fine pictures.

In accordance with one aspect of the present invention, there is provided a liquid crystal display panel for producing a visual image comprising a first substrate structure including a transparent substrate having a central area assigned to conductive lines and components for forming the visual image and a frame area around the central area and assigned to non-transparent conductive strips selectively connected to the conductive lines for selectively energizing the components, a second substrate structure opposing the first substrate structure, a seal layer formed between the first substrate structure and the second substrate structure in such a manner as to extend in the frame area along a certain route and liquid crystal filling a gap defined by the inner surfaces of the first and second substrate structures opposite to each other and the seal layer, and at least one vernier is formed in at least one of the non-transparent conductive strips for defining the certain route.

In accordance with another aspect of the present invention, there is provided a liquid crystal display panel for producing a visual image, comprising a first substrate structure including a transparent substrate having a central area assigned to conductive lines and components for forming the visual image and a frame area around the central area and assigned to non-transparent conductive strips selectively connected to the conductive lines for selectively energizing the components and an orientation layer formed over the central area and an inner sub-area of the frame area contiguous to the central area, a second substrate structure opposing the first substrate structure, a seal layer formed between the first substrate structure and the second substrate structure in such a manner as to extend in the frame area and liquid crystal filling a gap defined by the inner surfaces of the first and second substrate structures opposite to each other and the seal layer, and at least one vernier is formed in at least one of the non-transparent conductive strips so as to give a criteria to see whether or not the orientation layer is properly located.

BRIEF DESCRIPTION OF THE DRAWINGS

The features and advantages of the liquid crystal display panel will be more clearly understood from the following description taken in conjunction with the accompanying drawings in which.

DESCRIPTION OF THE PREFERRED EMBODIMENTS

First Embodiment

Figure 4:
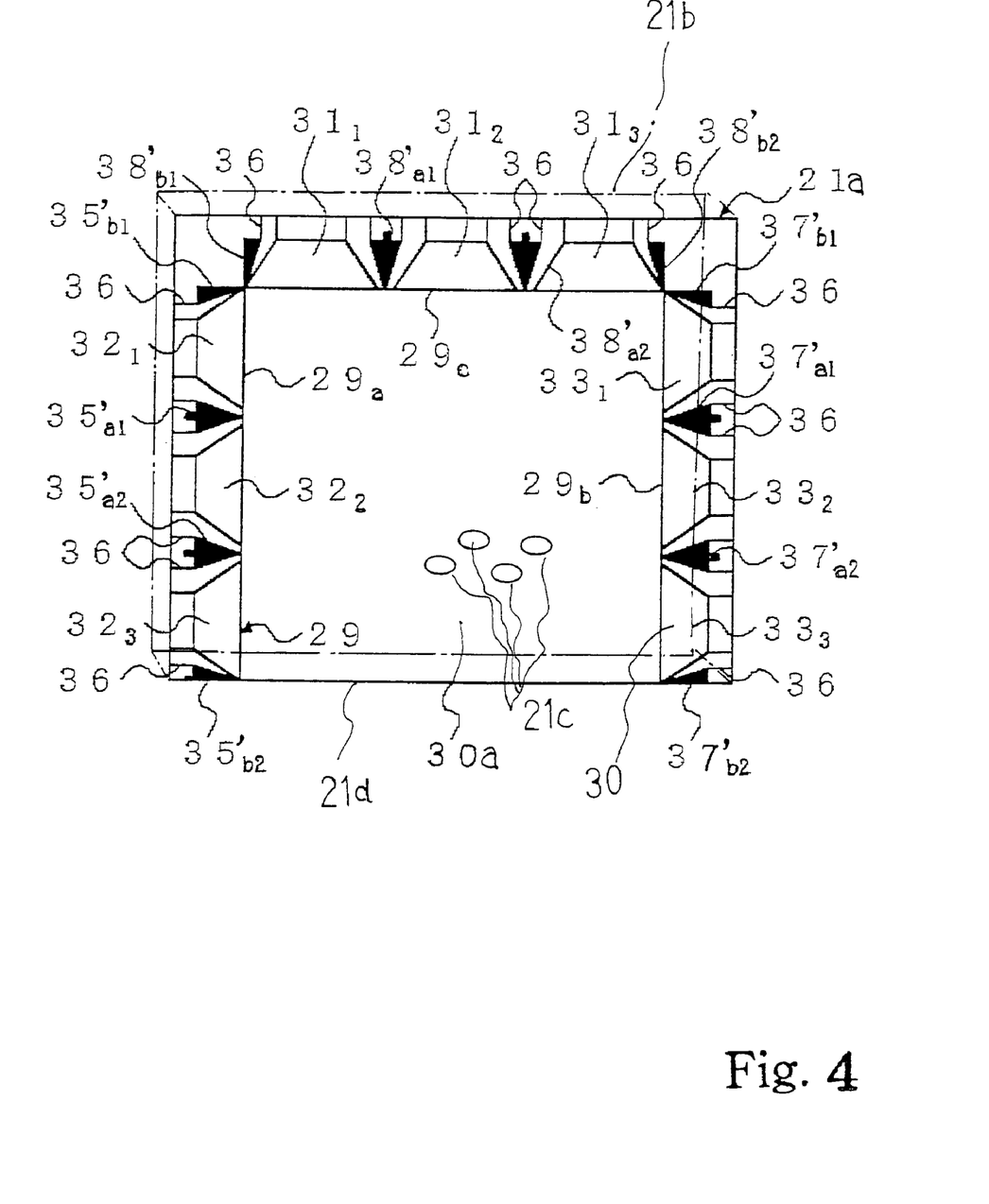
FIG. 4 is a plane view showing the arrangement of terminals and interconnections on the inner surface of a substrate structure forming a part of a liquid crystal display panel according to the present invention.
Figure 5:
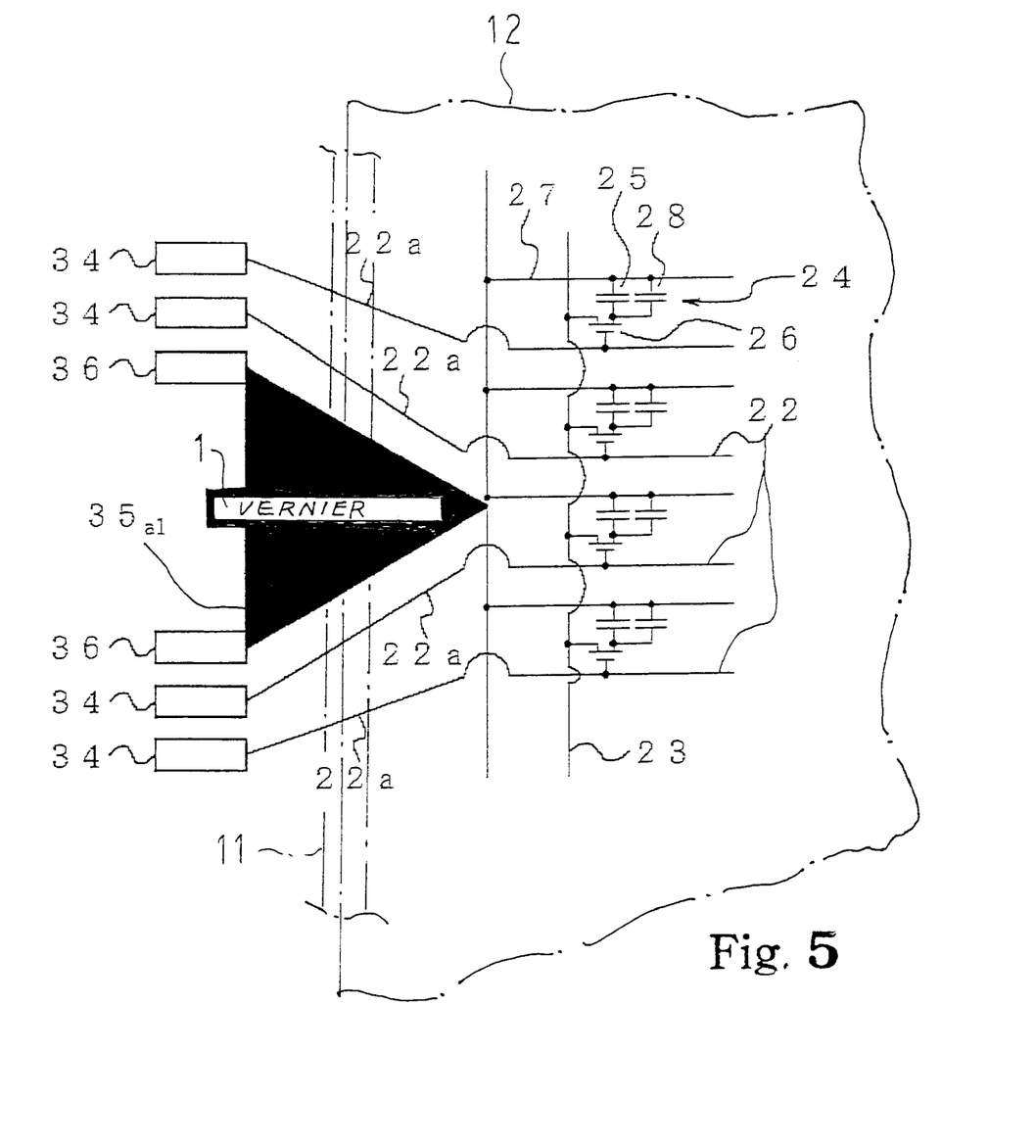
FIG. 5 is a schematic view showing the connection between terminal/interconnection/connectors and signal lines on the inner surface of the substrate structure.

Referring to FIG. 4 of the drawings, an active matrix full color liquid crystal display panel embodying the present invention largely comprises a first substrate structure 21a, a second substrate structure 21b and liquid crystal filling the space between the first substrate structure 21a and the second substrate structure 21b. Four ellipsoids stand for four liquid crystal molecules in the liquid crystal, and the liquid crystal molecules are labeled with reference 21c. The first substrate structure has a transparent substrate 21d, and the transparent substrate 21d is divided into an image-forming area 30a and a frame area 30c. FIG. 5 shows a part of the frame area 30c and pixels 24, scanning lines 22 one of the data lines 23 and common signal lines 27 formed in a part of the image-forming area 30a adjacent to the part of the frame area 30c. A seal layer 11 is formed along the periphery of the transparent glass substrate 21d, and extends along a predetermined route. Orientation layers 12 form the inner surfaces of the first and second substrate structures 21a/21b, and the liquid crystal 21c are sealed in the space defined by the orientation layers 12 and the seal layer 11.

The image-forming area 30a is assigned to the matrix of pixels 24 and the common/data/scanning signal lines 27/23/22, and the frame-area 30b is assigned to a common line 29, terminal blocks $31_1$ to $31_3$, $32_1$ to $32_3$, $33_1$ to $33_3$ and common terminals 36 and connectors $35'_{a1}$, $35'_{a2}$, $35'_{b1}$, $35'_{b2}$, $37'_{a1}$, $37'_{a2}$, $37'_{b1}$, $37'_{b2}$, $38'_{a1}$, $38'_{a2}$, $38'_{b1}$ and $38'_{b2}$. The common line 29 extends along a pair of the side lines of the transparent glass substrate 21d and one of the end lines, and the three portions of the common line 29 are labeled with 29a, 29b and 29c, respectively.

One of the connectors $35'_{a1}$ and the associated terminal block are enlarged in FIG. 5. The connector $35'_{a1}$ is formed of non-transparent conductive material, and occupies a triangle area. Negative verniers 1 are formed in the non-transparent conductive connectors, and will be described in hereinafter in detail.

The connectors $35'_{a1}$, $35'_{a2}$, $35'_{b1}$, $35'_{b2}$, $37'_{a1}$, $37'_{a2}$, $37'_{b1}$, $37'_{b2}$, $38'_{a1}$, $38'_{a2}$, $38'_{b1}$ and $38'_{b2}$ have wide areas so that the resistance is reduced. The non-transparent triangle connectors $35'_{a1}$, $35'_{a2}$, $35'_{b1}$, $35'_{b2}$, $37'_{a1}$, $37'_{a2}$, $37'_{b1}$, $37'_{b2}$, $38'_{a1}$, $38'_{a2}$, $38'_{b1}$ and $38'_{b2}$ further serve as a photo-shield meas. Most of the connectors are similar to one another, and description is focused on one of the connectors $35'_{a1}$.

The connector $35'_{a1}$ is connected at the outer end thereof to the common terminals 36 and at the inner end thereof to the common line 29a. Signal terminals 34 are formed on both sides of the common terminals 36, and are assigned to a scanning signal. The common terminals 36 and the signal terminals 34 are non-transparent. The signal terminals 34 are connected to the scanning lines 22 through interconnections 22a, and the scanning lines 22 extend in parallel to one another across the central area 30a. The data lines 23 extend in parallel to one another across the central area 30a in a direction perpendicular to the scanning lines 22. Although plural data lines 23 are formed in the central area 30a, only one data line 23 is shown in FIG. 5.

The pixels 24 are arranged in rows and columns. Each of the pixel 24 is equivalent to a series combination of a thin film transistor 26 and a parallel combination of capacitors 25/28. A common electrode, a pixel electrode and a piece of liquid crystal therebetween form each pixel 24, and the other capacitor 28 is called as "common storage". The scanning lines 22 are connected to the gate electrodes of the thin film transistors 26 in the rows of pixels 24, respectively, and the data lines 23 are connected to the drain nodes of the thin film transistors 26 in the columns of pixels 24, respectively. In this instance, the common lines 27, data lines 23, scanning lines 22, thin film transistors 26, pixel electrodes and common electrodes are formed in the first substrate structure 21a, and color filters and black matrix are formed in the second substrate structure 21b.

When a picture is to be produced in the matrix of pixels 24, the scanning lines 22 are sequentially changed to an active level, and an image-carrying signal is synchronously supplied through the data lines 23 to the rows of pixels 24. The pixels 24 selectively become transparent, and permit the back light to pass therethrough so that the picture is produced on the matrix of pixels 24.

Figure 6:
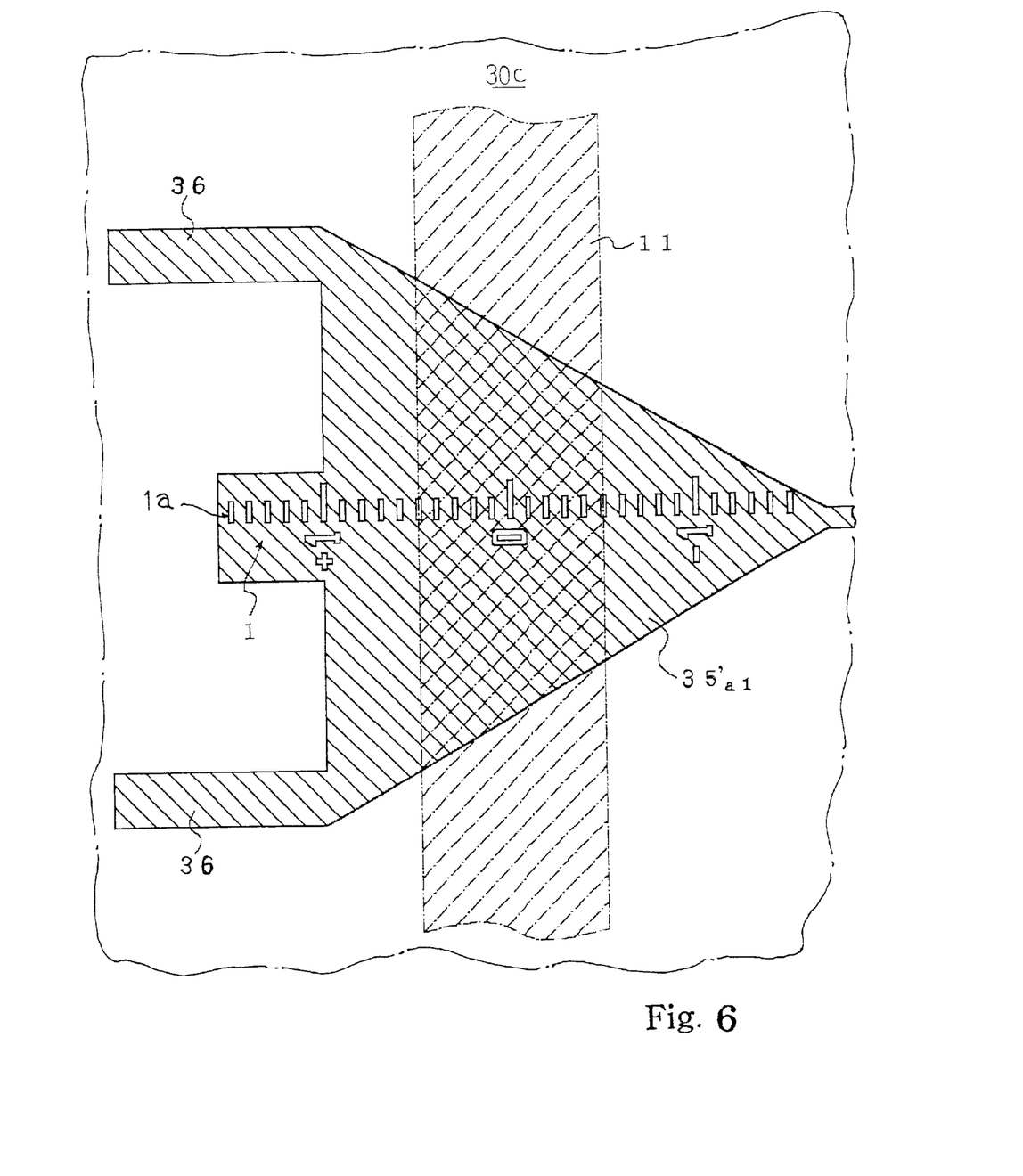
FIG. 6 is a plane view showing the arrangement of a negative vernier formed in the connector for a sealing line.

As described hereinbefore, the negative verniers 1 are formed in the non-transparent triangle connectors, and one of the non-transparent triangle connectors $35'_{a1}$ is shown in FIG. 6. The nontransparent substance is partially removed from the connector $35'_{a1}$, and vacant areas are formed in the connector $35'_{a1}$. The transparent glass substrate 21d is exposed to the vacant areas. The vacant areas serve as the negative vernier 1 so that the negative vernier 1 is transparent. Accordingly, the wide remaining portion of the connector $35'_{a1}$ is conductive. A certain constant voltage is propagated through the wide remaining portions of the connectors $35'_{a1}$, $35'_{a2}$, $35'_{b1}$, $35'_{b2}$, $37'_{a1}$, $37'_{a2}$, $37'_{b1}$, $37'_{b2}$, $38'_{a1}$, $38'_{a2}$, $38'_{b1}$ and $38'_{b2}$ and the common lines 27 to the common electrodes. The wide remaining portions make the resistance between the common lines 27 and the terminals 36 low, and, for this reason, the potential level on the common electrodes does not undesirably rise. Moreover, the back light is merely leaked through the extremely narrow vacant areas, and hardly penetrates into the image-forming area 30a.

The negative vernier 1 is constituted by graduations 1a and numerals "+1", "0" and "−1". The graduations 1a are arranged at regular intervals in the direction perpendicular to the side lines of the transparent glass substrate 21d, and the numeral "0" is indicative of the target point through which the centerline of the predetermined route is to be pass. The numeral "+1" is indicative of the tenth graduation on the inner side of the target point, and the other numeral "−1" is indicative of the tenth graduation on the outer side of the target point. In this instance, each of the graduations 1a is equivalent to 0.1 millimeter, and the seal layer 11 is designed to be 1 millimeter wide.

In a process for fabricating the first substrate structure 21a, the seal layer 11 is printed in the frame area 30c. The terminals 34/36 and the connectors $35'_{a1}$, $35'_{a2}$, $35'_{b1}$, $35'_{b2}$, $37'_{a1}$, $37'_{a2}$, $37'_{b1}$, $37'_{b2}$, $38'_{a1}$, $38'_{a2}$, $38'_{b1}$ and $38'_{b2}$ have been already formed on the frame area 30c. When the seal layer 11 is formed in the frame area 30c, the manufacturer checks the negative vernier 1 to see whether or not the seal layer 11 extends along the predetermined route. The seal layer 11 occupies the area from −0.5 millimeter to +0.5 millimeter. The centerline passes through the graduation "0", and the width is 1 millimeter. The manufacturer decides that the seal layer 11 is exactly formed along the predetermined route. The predetermined route is to be fallen within a range defined on both sides of the graduation at "0". Then, the manufacturer assembles the first and second substrate structures 21a and 21b, and injects the liquid crystal 21c into the space defined by the orientation layers 12 and the seal layer 11. Thus, the manufacturer inspects the seal layer 11 before the assemblage by using the negative vernier 1, and rejects the first substrate structures formed with the seal layer 11 widely deviated from the predetermined route and first substrate structures formed with narrow seal layers. The seal layer 11 on the predetermined route does not permit the back light to penetrate into the image-forming area 30a, and any irregularity in brightness does not take place in a picture formed in the matrix of pixels 24.

As will be understood from the foregoing description, the negative vernier 1 neither reduces the conductivity of the connectors nor leaks the back light into the image forming area 30a. The negative vernier 1 is formed in the non-transparent conductive connectors, and any additional area is required for the negative vernier 1. The frame area 30c is as narrow as that of the substrate structure shown in FIGS. 1 and 2, and the active matrix full color liquid crystal panel is enhanced in reliability by virtue of the vernier formed in the non-transparent conductive connectors. Thus, the present invention solves the problems inherent in the prior arts.

The negative vernier is advantageous over the positive vernier. The non-transparent connectors perfectly prohibits the image forming area 30a from the leakage light as described hereinbefore. Moreover, the negative vernier 1 is durable rather than the positive vernier. The positive vernier is formed from plural small pieces of non-transparent strips, and the small pieces of non-transparent strips are much liable to peel from the transparent glass substrate. On the other hand, the negative verinier 1 is defined by a large non-transparent connector. The large non-transparent connector is less liable to peel off. Thus, the negative vernier 1 is durable.

Second Embodiment

Figure 7:
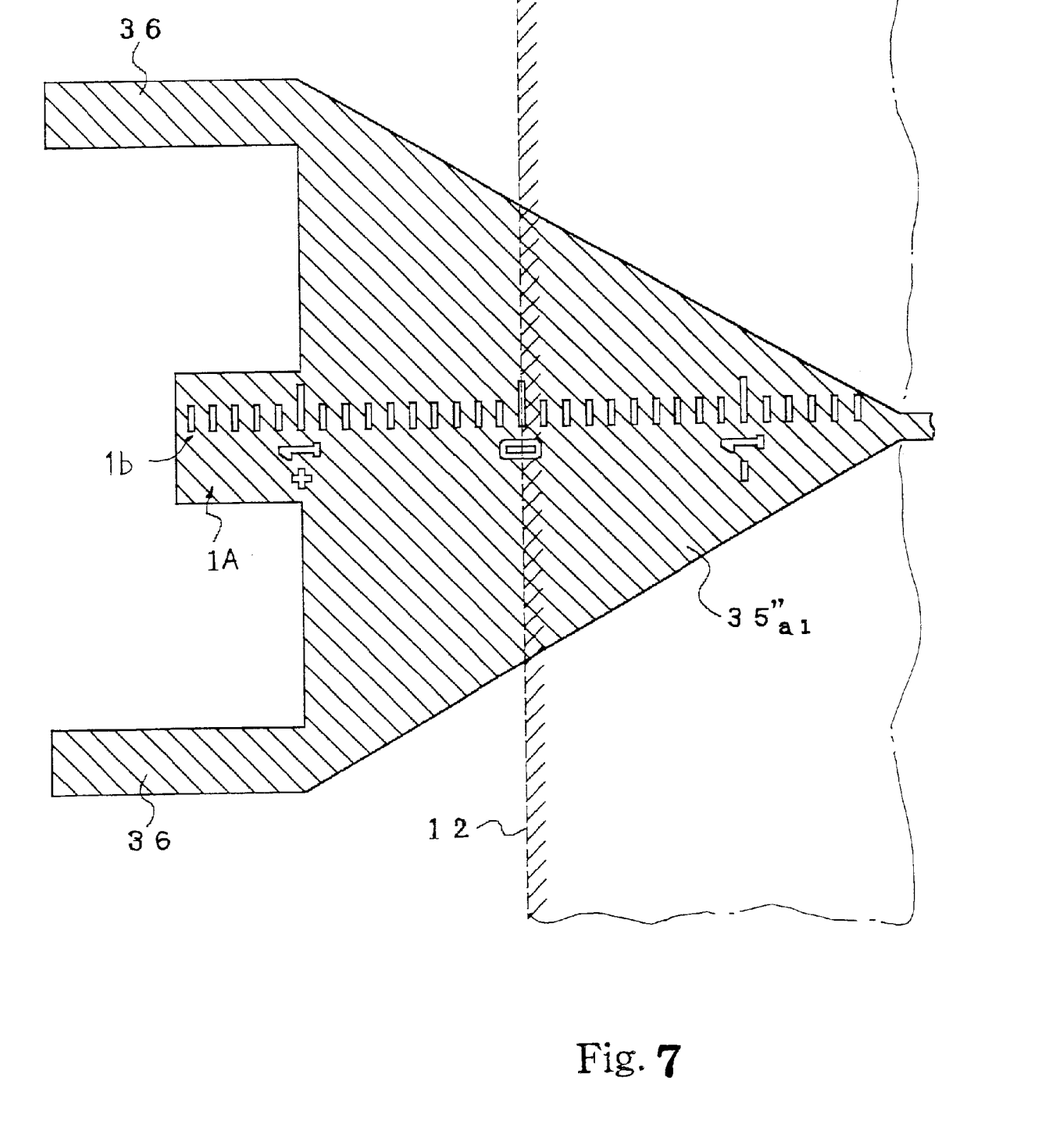
FIG. 7 is a plane view showing the arrangement of a negative vernier formed in the connector for an orientation layer.

FIG. 7 shows another negative vernier 1A formed in a frame area of a substrate structure. The substrate structure is similar in structure to that of the first substrate structure 21a, and forms another active matrix full color liquid crystal display panel together with the second substrate structure and the liquid crystal. The substrate structure, the second substrate structure and the liquid crystal are similar to those of the first embodiment except the negative vernier 1A. For this reason, description is focused on the negative vernier 1A for the sake of simplicity.

The negative vernier 1A also has graduations 1b and numerals "+1", "0" and "−1". The graduations 1b are designed for the orientation layer 12, and the graduation indicated by "0" is indicative of a target point through which the peripheral line of the orientation layer 12 is to pass.

When the manufacturer forms the orientation layer 12, the manufacture inspects the orientation layer 12 with the negative vernier 1A. The manufacturer checks the negative vernier 1A to see whether or not the peripheral line of the orientation layer 12 is aligned with the graduation "0". In this instance, the peripheral line is aligned with the graduation indicated by "0", and the manufacturer decides the orientation layer 12 to be exactly aligned with the matrix of pixels 24.

The active matrix full color liquid crystal display panel implementing the second embodiment achieves all the advantages of the first embodiment by virtue of the negative vernier 1A.

In the above-described embodiments, the common signal lines 27, scanning lines 22 and data lines 23 serve as conductive lines, and the thin film transistors 26 and the parallel combinations of capacitors 25/28 are corresponding to components. The terminals and the non-conductive triangle connectors $35'_{a1}$, $35'_{a2}$, $35'_{b1}$, $35'_{b2}$, $37'_{a1}$, $37'_{a2}$, $37'_{b1}$, $37'_{b2}$, $38'_{a1}$, $38'_{a2}$, $38'_{b1}$ and $38'_{b2}$ and $35''_{a1}$ serve as the non-transparent conductive strips.

Although particular embodiments of the present invention have been shown and described, it will be apparent to those skilled in the art that various changes and modifications may be made without departing from the spirit and scope of the present invention.

The negative verniers 1 and 1A may be alternately formed in the non-transparent conductive connectors.

If the generally rectangular opening 36a is relatively narrow rather than the remaining non-transparent portion, the positive vernier 2 may be used for a liquid crystal display panel according to the present invention.

A negative vernier may be constituted by graduations, only. Otherwise, only the slits indicative of the limits may be formed in the non-transparent connectors.

The negative vernier may be formed in non-transparent electrodes formed in the frame area.

The vernier may be formed in another kind of liquid crystal display panel.

What is claimed is:

1. A liquid crystal display panel for producing a visual image, comprising:
   a first substrate structure including a transparent substrate having a central area assigned to conductive lines and components for forming said visual image and a frame area around said central area and assigned to non-transparent conductive strips selectively connected to said conductive lines for selectively energizing said components, at least one vernier being formed in at least one of said non-transparent conductive strips;
   a second substrate structure opposing said first substrate structure;
   a seal layer formed between said first substrate structure and said second substrate structure in such a manner as to extend in said frame area along a certain route defined by using said at least one vernier; and
   liquid crystal filling a gap defined by the inner surfaces of said first and second substrate structures opposite to each other and said seal layer.

2. The liquid crystal display panel as set forth in claim 1, in which said at least one vernier includes graduations arranged at regular intervals.

3. The liquid crystal display panel as set forth in claim 2, in which said at least one vernier further includes numerals indicative of positions of selected ones of said graduations.

4. The liquid crystal display panel as set forth in claim 1, in which said at least one vernier is implemented by vacant areas formed in said at least one so that said transparent substrate are partially exposed to said at least one vernier.

5. The liquid crystal display panel as set forth in claim 4, in which said vacant areas define graduations arranged at regular intervals.

6. The liquid crystal display panel as set forth in claim 5, in which said vacant areas further define numerals indicative of positions of selected ones of said graduations.

7. The liquid crystal display panel as set forth in claim 1, in which said components are plural combinations each having a thin film transistor and a capacitor connected in series to said thin film transistor, and in which said non-transparent conductive strips are signal terminals selectively connected through the signal lines to the thin film transistors of said plural combinations and conductive connectors electrically connected to said capacitors, wherein said at least one vernier is formed in one of said conductive connectors.

8. The liquid crystal display panel as set forth in claim 7, in which said at least one vernier is implemented by vacant areas formed in said one of said conductive connectors so that said transparent substrate are partially exposed to said at least one vernier.

9. The liquid crystal display panel as set forth in claim 8, in which said vacant areas define graduations arranged at regular intervals.

10. The liquid crystal display panel as set forth in claim 9, in which said vacant areas further define numerals indicative of positions of selected ones of said graduations.

11. The liquid crystal display panel as set forth in claim 7, in which said at least one vernier is implemented by vacant areas formed in said one of said conductive connectors so that said transparent substrate are partially exposed to said at least one vernier.

12. The liquid crystal display panel as set forth in claim 11, in which said vacant areas define graduations arranged at regular intervals.

13. The liquid crystal display panel as set forth in claim 12, in which said vacant areas further define numerals indicative of positions of selected ones of said graduations.

14. A liquid crystal display panel for producing a visual image, comprising:
   a first substrate structure including a transparent substrate having a central area assigned to conductive lines and components for forming said visual image and a frame area around said central area and assigned to non-transparent conductive strips selectively connected to said conductive lines for selectively energizing said components and an orientation layer formed over said central area and an inner sub-area of said frame area contiguous to said central area, at least one vernier being formed in at least one of said non-transparent conductive strips so as to give a criteria to see whether or not said orientation layer is properly located;
   a second substrate structure opposing said first substrate structure;
   a seal layer formed between said first substrate structure and said second substrate structure in such a manner as to extend in said frame area; and
   liquid crystal filling a gap defined by the inner surfaces of said first and second substrate structures opposite to each other and said seal layer.

15. The liquid crystal display panel as set forth in claim 14, in which said at least one vernier includes graduations arranged at regular intervals.

16. The liquid crystal display panel as set forth in claim 15, in which said at least one vernier further includes numerals indicative of positions of selected ones of said graduations.

17. The liquid crystal display panel as set forth in claim 14, in which said at least one vernier is implemented by vacant areas formed in said at least one so that said transparent substrate are partially exposed to said at least one vernier.

18. The liquid crystal display panel as set forth in claim 17, in which said vacant areas define graduations arranged at regular intervals.

19. The liquid crystal display panel as set forth in claim 18, in which said vacant areas further define numerals indicative of positions of selected ones of said graduations.

20. The liquid crystal display panel as set forth in claim 14, in which said components are plural combinations each having a thin film transistor and a capacitor connected in series to said thin film transistor, and in which said non-transparent conductive strips are signal terminals selectively connected through the signal lines to the thin film transistors of said plural combinations and conductive connectors electrically connected to said capacitors, wherein said at least one vernier is formed in one of said conductive connectors.

* * * * *